United States Patent [19]
Humpert

[11] Patent Number: 5,161,567
[45] Date of Patent: Nov. 10, 1992

[54] ESCUTCHEON FOR RECESSED PLUMBING FIXTURE

[75] Inventor: Jürgen Humpert, Hemer, Fed. Rep. of Germany

[73] Assignee: Friedrich Grohe Armaturenfabrik GmbH & Co., Hemer, Fed. Rep. of Germany

[21] Appl. No.: 786,391

[22] Filed: Nov. 1, 1991

[30] Foreign Application Priority Data

Nov. 12, 1990 [DE] Fed. Rep. of Germany ....... 4035911

[51] Int. Cl.⁵ ................................................ F16L 5/00
[52] U.S. Cl. ...................................... 137/359; 137/801
[58] Field of Search .................... 137/359, 801; 4/192, 4/195

[56] References Cited

U.S. PATENT DOCUMENTS

| | | | |
|---|---|---|---|
| 3,010,474 | 11/1961 | Moen | 4/192 X |
| 4,979,538 | 12/1990 | Krippendorf et al. | 4/192 X |
| 4,989,278 | 2/1991 | Kostorz | 4/192 X |

FOREIGN PATENT DOCUMENTS 8009457 7/1980 Fed. Rep. of Germany.

Primary Examiner—Martin P. Schwadron
Assistant Examiner—Kevin L. Lee
Attorney, Agent, or Firm—Herbert Dubno; Andrew Wilford; Yuri Kateshov

[57] ABSTRACT

A plumbing fixture that is recessed in a wall and that has a part projecting through a hole in the wall is provided with an escutcheon having a main plate shaped to fit around the part flatly against the wall and to cover the hole, at least one fastener engageable through the main plate with the fixture to press the plate against the wall, a cover plate fittable on the main plate over the fastener, and formations integrally formed with the plates and securing the plates together. The main plate has an outer periphery provided with a soft seal ring engaging the wall. In addition the main plate has inward of its outer periphery a central recess in which the cover plate is received. The formations include pins unitarily formed on the cover plate and complementary seats unitarily formed in the main plate.

6 Claims, 3 Drawing Sheets

ESCUTCHEON FOR RECESSED PLUMBING FIXTURE

FIELD OF THE INVENTION

The present invention relates to an escutcheon plate for a recessed plumbing fixture. More particularly this invention concerns such an escutcheon plate for a wall-mounted recessed valve such as is used in a tub enclosure.

BACKGROUND OF THE INVENTION

A standard escutcheon such as described in German utility model 8,009,457 has a main plate normally made of metal that fits over the projecting parts of the plumbing fixture and that covers the hole in the wall through which the fixture projects, and a cover plate normally made of a colored synthetic resin that serves as an accent and that may also cover up some adjustment or access holes in the main plate. Screws whose heads are colored the same as the cover plate project through the cover plate and the main plate into the plumbing fixture to secure the escutcheon in place.

The disadvantage of such an arrangement is that the screws are easily scratched or damaged during installation, so that they do not match the cover plate perfectly. In a fancy designer installation this is of course intolerable, and getting new screws of the right color can be a problem for the installer.

OBJECTS OF THE INVENTION

It is therefore an object of the present invention to provide an improved escutcheon for a recessed plumbing fixture.

Another object is the provision of such an improved escutcheon for a recessed plumbing fixture which overcomes the above-given disadvantages, that is which can be put together without worrying about damaging the fasteners that secure it to the fixture.

SUMMARY OF THE INVENTION

A plumbing fixture that is recessed in a wall and that has a part projecting through a hole in the wall is provided with an escutcheon having a main plate shaped to fit around the part flatly against the wall and to cover the hole, at least one fastener engageable through the main plate with the fixture to press the plate against the wall, a cover plate fittable on the main plate over the fastener, and formations integrally formed with the plates and securing the plates together.

Thus with this arrangement the fasteners, which normally are simple screws, are concealed by the cover plate so that they cannot present a bad appearance even if marred during installation.

According to the invention the main plate has an outer periphery provided with a soft seal ring engaging the wall. In addition the main plate has inward of its outwardly projecting outer periphery a central recess in which the cover plate is received. The formations include pins unitarily formed on the cover plate and complementary seats unitarily formed in the main plate.

It is also possible for the main plate as described above to have an outer periphery provided with a soft seal ring engaging the wall and a central region that can be broken out for use of the main plate as a spacer ring between another such main plate and the wall. This makes it possible to accommodate an installation where the fixture projects excessively from the wall. In this case the main plate is made of a synthetic resin.

For best sealing according to the invention the main plate is formed with an aperture through which the fixture projects and is provided around the aperture with a seal ring engaging the fixture.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
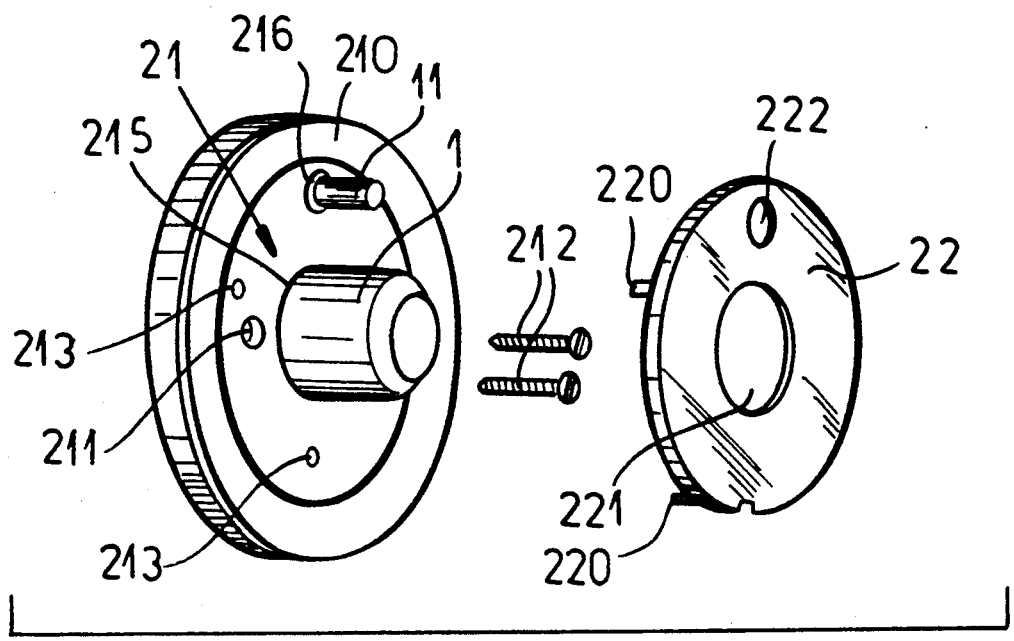
FIG. 1 is a small-scale exploded view of an escutcheon according to the invention.
Figure 2:
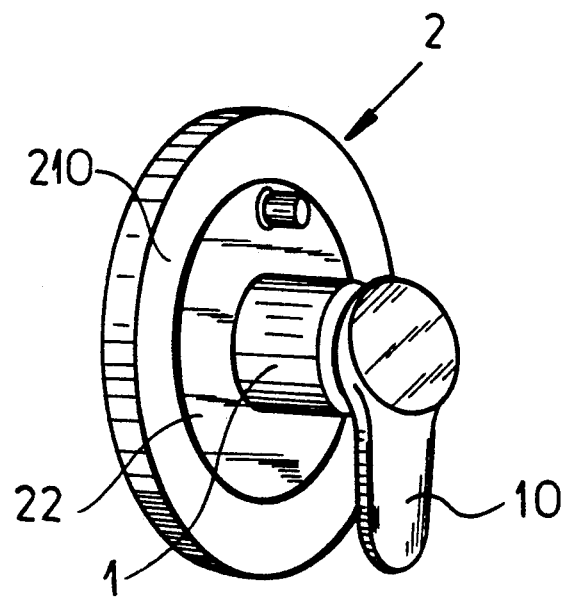
FIG. 2 is a perspective view of the assembled escutcheon of FIG. 1.

As seen in FIGS. 1 and 2 a plumbing fixture 1 recessed in a wall is provided with an escutcheon 2 basically formed of a main plate 21 made of metal and a smaller colored cover plate 22 made of a synthetic resin with a powder-lacquer coating.

The main plate 21 is basically flat and of circular shape with an outer rim 210 fashioned to hold a soft seal. In addition this plate 21 is formed with a central hole 215 through which the main part of the fixture projects and with a smaller off-center hole 216 through which another part 11 of the fixture 1 extends. In this situation the fixture 1 is a wall-mount shower valve for tub use and the part 11 selects flow to the shower or to the faucet.

In addition the plate 21 is formed with two through-going holes 211 through which screws 212 are engaged to seat in the fixture 1 and hold the plate 21 in place. This solidly mounts the plate 21 on the wall, compressing the seal in the rim 210 against the wall.

The cover plate 22 is a disk formed with holes 221 and 222 that correspond to the holes 215 and 216 and that fit over the fixture 1 and its part 11. In addition the back face of this synthetic-resin plate 22 is formed with three angularly spaced and rearwardly projecting pins 220 that can be press-fitted into complementary holes or recesses 213 formed in the front face of the plate 21. These pins 220 therefore secure the plate 22 to the plate 21, which in turn is solidly screwed to the fixture 1. The plate 22 covers the screws 212 and also any other access or adjustment holes that might be formed in the plate 21.

Figure 3:
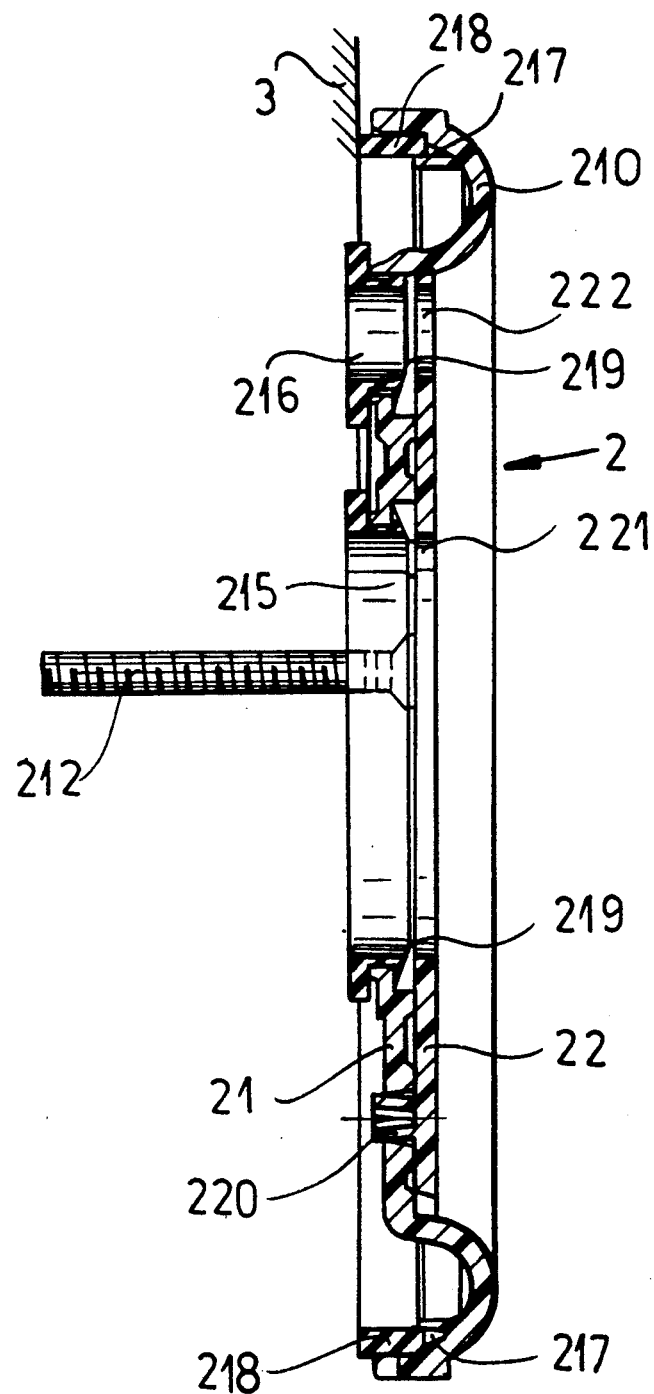
FIG. 3 is an axial section through another escutcheon according to the invention.

The arrangement of FIG. 3 is similar to that of FIG. 1, except that the disk 21 is also made of a synthetic resin, a rigid one chosen for its strength. FIG. 3 also shows a seal 218 held by a lip 217. In the rim 210 in addition seals 219 are provided in the holes 215 and 216 to seal around the fixture 1 and its part 11. The wall is shown schematically at 3.

Figure 4:
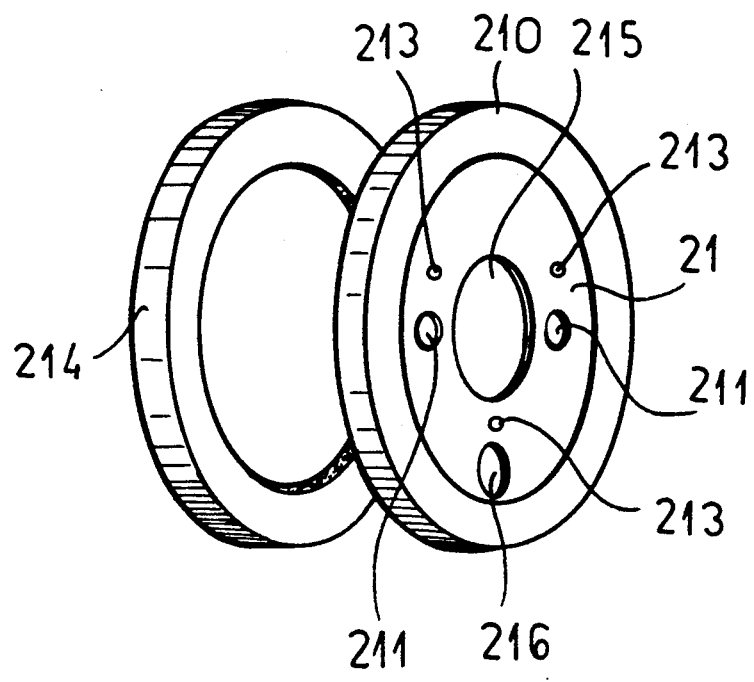
FIGS. 4 and 5 are exploded and perspective views like FIGS. 1 and 2 of yet another escutcheon in accordance with this invention.
Figure 5:
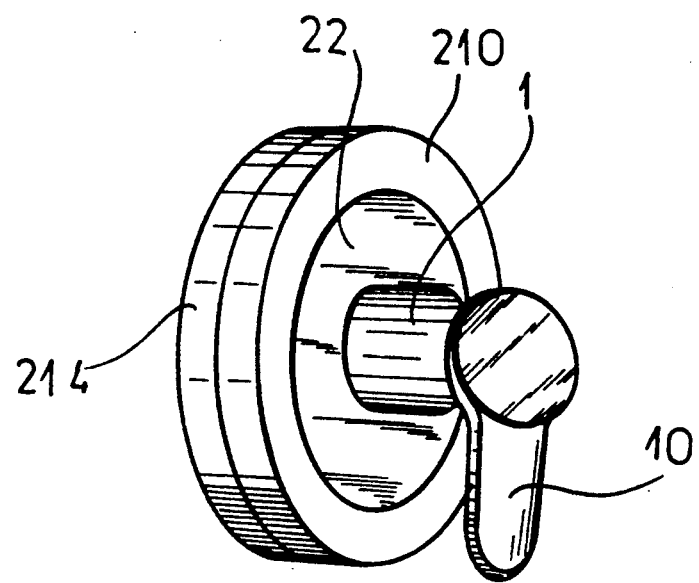

In FIGS. 4 and 5 the fixture 1 projects with its handle 10 quite a bit from the wall so that it is impossible to screw down the two plates 21 and 22 to seat them on the wall. In this arrangement the center of a second such plate 21 is punched out to form a ring 214 that is used as a spacer behind the rim 210 and the wall 3, making the installation fairly neat. The central region of the plate 21 is specially made, for instance by providing a weakening groove, so that it can be broken out if desired for this type of installation. In this arrangement the plate 22 has no hole 222, as the fixture I here does not have the part 11.

I claim:

1. In combination with a plumbing fixture that is recessed in a wall and that has a part projecting through a hole in the wall, an escutcheon comprising:
   - a main plate shaped to fit around the part flatly against the wall and to cover the hole;
   - at least one fastener engageable through the main plate with the fixture to press the plate against the wall;
   - a cover plate formed with an inner face and an outer face and fittable on the main plate over the fastener with the inner face confronting the main plate, the cover plate being formed with at least one opening through which the part of the fixture projects; and
   - formations integrally formed with the plates for securing the plates together, the formations including
     - a plurality of pins formed unitarily with the inner face of the cover plate and projecting inwardly therefrom, and
     - respective complementary seats receiving the pins and unitarily formed in the main plate, the outer face having a continuous surface except for the opening.

2. The escutcheon defined in claim 1 wherein the main plate has an outer periphery provided with a soft seal ring engaging the wall.

3. The escutcheon defined in claim 1 wherein the main plate is formed with an outwardly projecting outer periphery and inward thereof a central recess in which the cover plate is received.

4. The escutcheon defined in claim 1 wherein the main plate is formed with an aperture through which the fixture projects and is provided around the aperture with a seal ring engaging the fixture.

5. In combination with a plumbing fixture that is recessed in a wall and that has a part projecting through a hole in the wall, an escutcheon comprising:
   - inner and outer main plates juxtaposed with each other and of similar shape, the inner plate fitting around the part flatly against the wall for covering the hole and formed with
     - an outer periphery provided with a soft seal ring engaging the wall, and
     - a central region broken out for use of the inner main plate as a spacer ring between the outer main plate and the wall;
   - at least one fastener engageable through the main plates with the fixture to press the plates against the wall;
   - a cover plate fittable on the main plate over the fastener; and
   - formations integrally formed with the cover and main plates for securing the plates together.

6. The escutcheon defined in claim 5 wherein the main plates are made of a synthetic resin.

* * * * *